Patented Feb. 26, 1952

2,587,267

UNITED STATES PATENT OFFICE 2,587,267

WATER-EMULSIFIABLE METALLIC PASTE PIGMENTS

Robert I. Wray, New Kensington, and Wayne B. Roberts, Mount Lebanon, Pa., assignors to Aluminum Company of America, Pittsburgh, Pa., a corporation of Pennsylvania No Drawing. Application November 19, 1948, Serial No. 61,118

6 Claims. (Cl. 106—290)

This invention relates in general to water-emulsifiable, paste pigment formulations, and in particular to such formulations in which the pigment portion is composed of metallic flakes. The invention is primarily concerned with water-emulsifiable, paste pigments in which aluminum flake constitutes the metallic portion of the formulations. It should not be limited to aluminum, however, since other metals and their alloys may be substituted.

Metallic flake pigments are now available in dry powder and paste forms. The dry powder pigments are composed of fine particles of metal the surfaces of which are coated with a film comprising a fatty acid, or mixtures thereof. The paste pigments are composed of fine particles of metal coated with a film comprising a fatty acid, or mixtures thereof, and in addition sufficient volatile hydrocarbon to give paste consistency to the product.

Metallic paste pigments may be manufactured from previously disintegrated metal pigments in dry form by simple admixture with a volatile hydrocarbon, such as mineral spirits, or the paste pigment may be initially produced in a wet milling process and filtered to its desired consistency.

Regardless of the initial form or manner in which a metallic pigment is produced, we have discovered that metallic paste pigments can be manufactured by additions of certain materials to presently known metallic pigments to provide water-emulsifiable metallic pigments in paste form that are characterized by their stability, paste-retaining consistency and freedom from agglomerate formation under storage conditions sealed against atmosphere.

Heretofore, a variety of steps have been practiced in the preparation and manufacture of water type pigments and paste formulations to obtain the proper reactions between the ingredients entering into their production. For example, a cooking step has been employed for the most part in the case of casein-containing water-emulsifiable paste pigments to react the casein with one or more ingredients of the formulations before final admixture with the water vehicle. Several separate mixing steps have also been found in many instances necessary in water paint and paste manufacture.

We have presently pending an application for United States Letters Patent, Serial No. 43,551, filed August 10, 1948, that describes and claims water-emulsifiable, metallic paste pigments which contain casein as an active ingredient. The present invention is directed to casein-free metallic paste pigments.

A primary object of the invention is to provide a stable, water-emulsifiable, metallic paste pigment that is characterized by freedom from hardening tendencies and agglomerate formation under storage conditions which exclude free access to the atmosphere.

A further object of the invention is to provide a water-emulsifiable metallic paste pigment, specifically a metallic aluminum flake containing paste pigment, that is free from casein, and includes a water-soluble, soap-forming amino compound in its formulation and manufacture.

Another object of the invention is to provide a stable mixture of ingredients to form a metallic flake pigment that, on mixture with water and stirring, provides a water paint characterized by its metallic sheen and brilliance.

It is an object of the present invention to provide a stable, water-emulsifiable metallic pigment in paste form which is substantially free from agglomerates and any objectionable reaction in the paste during storage.

Another object is to provide a composition of matter that contains metallic pigment and which is water-miscible to produce a water-dispersible paint suitable for mold wash, as well as being decorative and capable of producing economical paint films.

A further object is to provide a metallic paste pigment composition that lends itself to the production of water-emulsifiable, metallic inks, paints and coating compositions that are substantially free from the disadvantages inherent in the use of oil type paints on paper and similar fibrous materials.

Other objects and advantages of the invention will present themselves on consideration of the following specification, specific examples, and the appended claims.

According to the practice of the present invention, it has been discovered that metallic flake particles, manufactured either by a dry or paste process, can be formulated in water-emulsifiable paste form that responds favorably to packaging and storage without developing pressure or hardening. Metallic pastes forming the compositions and products of the invention have been satisfactorily prepared from mixtures of aluminum flake, mineral spirits, or other suitable hydrocarbon, and at least one grease or lubricating fatty acid selected from the group consisting of palmitic, stearic, oleic and ricinoleic acid, by admixture with commercial tall oil and a water-soluble, soap-forming amino compound. By "tall oil" is meant the commercial by-product from the digestion of wood pulp, which normally contains from about 40 to 55 per cent rosin acids, from about 40 to 55 per cent fatty acids, and from about 5 to 10 per cent unsaponifiable material, such as sterols, higher alcohols, hydrocarbons, and the like.

The water-soluble, soap-forming amino compounds selected from the group consisting of 2-amino-1-butanol, 2-amino-2-methyl-1-propanol, 2-amino-2-methyl-1,3-propanediol, the isopropanolamines, the ethanolamines, morpholine and mono-n-butyl amine, have been found satisfactory in that they are all, singly and in combination, capable of combining with the fatty acids and other organic acids present on the metallic flakes and in the tall oil, to produce effective emulsifying agents when the metallic paste pigments are mixed with water.

No attempt is made to explain the precise chemical phenomena that may take place in the water-emulsifiable, metallic paste pigment formulations or compositions forming the basis of this invention. The theory is advanced, however, that the water-soluble, soap-forming amino compounds stated above, which are further definable in terms of exhibiting an upper limit of seven carbon atoms and free from acid radicals, react and/or combine with some of the available fatty acid, acids, or mixtures thereof, as well as with the rosin acids, and/or other organic acids present on the metal flakes, in solution, or dispersed in the volatile hydrocarbon and associated tall oil, to form water-soluble soaps, such as ammonium soaps, tallates, and the like, during subsequent admixture of the metallic paste pigments with water. Regardless of the exact chemistry involved, the water-emulsifiable, metallic paste pigment formulations, falling within the scope of the invention are free from casein, are stable, and do not exhibit any tendency to harden under storage conditions which exclude free access to atmosphere and moisture.

Metallic aluminum pigments, whether produced by a dry or wet process, and having an approximate composition by weight in paste cake form, 70 to 85 per cent metal flakes, about 0.5 to 2.0 per cent fatty acid lubricant, and about 14.5 to 28.0 per cent volatile hydrocarbon serve as a satisfactory base material from which water-emulsifiable, metallic paste pigment formulations falling within the scope of the invention may be satisfactorily prepared. Similarly, metallic copper pigments having an approximate paste cake composition by weight, 80 to 90 per cent metal flakes, about 0.5 to 2.0 per cent fatty acid lubricant, and about 9.5 to 18.0 per cent volatile hydrocarbon have performed satisfactorily. It will be understood that the metal content of a paste pigment will vary appreciably for any given metal, and the examples given for aluminum and copper, respectively, are merely exemplary of specific metals selected for purposes of illustrating the invention.

The final products of the invention, namely, the water-emulsifiable metallic paste pigments containing one or more of the named water-soluble, soap-forming, amino compounds, are not emulsions as initially formed and are maintained as free from water as commercially practicable. We have found, however, that combined water, water of crystallization and small amounts of sorbed water may be tolerated in the water-emulsifiable, metallic paste pigment formulations at the time the products are packaged in sealed containers, providing the teaching and practice of the invention is followed.

The following examples are given in support of the practice of the invention, each formulation having been prepared to a standard formula by mixing 605 grams of metallic flakes, mineral spirits and a small amount of a fatty acid, or mixtures thereof, with 212 grams of commercial tall oil, of which up to 10 per cent may be resinous materials, such as ester gum, and 91 grams of at least one of the named amino, water-soluble, soap-forming compounds, the total weight of the formulation in each case being 908 grams.

*Example I*

A water-emulsifiable, aluminum paste pigment formulation was prepared in the above stated proportions by a single mixing operation, and on conversion to percentage composition by weight, the paste formulation comprised 52.3 per cent aluminum flake, 13.3 per cent mineral spirits, 1.0 per cent stearic acid, as determined in the initial aluminum paste cake containing mineral spirits, 21.0 per cent tall oil, 2.4 per cent ester gum and 10.0 per cent morpholine. The paste formulation exhibited good stability after several months storage in sealed containers, retaining its original paste consistency, freedom from agglomerate formation, and freedom from hardening. When mixed with water at room temperature, as well as with hot water, in amounts of about 6 grams of paste to 25 c. c. of water, the paste was readily emulsified and freely dispersed to form a free flowing water paint that was brushed on paper and metal panels with good results. The dried paint films exhibited characteristic metallic aluminum gloss, sheen and reflectivity.

*Example II*

A water-emulsifiable, copper paste pigment formulation was made in accordance with the practice of the invention by a simple mixing operation to a composition by weight, 54.0 per cent copper flake, 10.60 per cent mineral spirits, 2.0 per cent stearic acid, as determined in the initial copper paste cake containing mineral spirits, 23.4 per cent commercial tall oil and 10 per cent triethanolamine. The paste pigment dispersed readily in water at 140° F. in amounts of 12 grams of paste to 25 c. c. water to form a free-flowing water paint that brushed on paper and steel panels with good results to produce dried paint films exhibiting characteristic metallic copper appearance.

*Example III*

A third sample of water emulsifiable, aluminum paste pigment formulation was prepared to a composition by weight, 52.3 per cent aluminum flake, 13.3 per cent mineral spirits, 1.0 per cent stearic acid, as determined in the initial aluminum paste cake containing mineral spirits, 23.4 per cent tall oil and 10 per cent triethanolamine. The paste pigment retained its original paste consistency, was stable and free from agglomerates after several months storage. Water paint made therefrom flowed freely, and the dried paint films exhibited characteristic aluminum sheen, gloss and reflectivity.

*Example IV*

Another sample of water-emulsifiable, aluminum paste pigment formulation was made up by simple mixing to a composition by weight, 52.3 per cent aluminum flake, 13.3 per cent mineral spirits, 1.0 per cent stearic acid, as determined in the initial aluminum paste cake containing mineral spirits, 23.4 per cent tall oil and 10 per cent of the amino compound 2-amino-1-butanol. The metallic paste pigment dispersed readily in water and produced a paint the dried films of which had the characteristic appearance of aluminum.

*Example V*

This example of a water-miscible paste formulation falling within the concept of the invention was made from an initial aluminum flake paste cake which was produced using a nonleafing type lubricant, specifically oleic acid. The composition by weight of the paste formulation was 52.1 per cent aluminum flake, 14.0 per cent mineral spirits, 0.5 per cent oleic acid associated with the flakes and mineral spirits, 23.4 per cent tall oil and 10.0 per cent 2-amino-2-methyl-1-propanol. The paste formulation was mixed with hot water at 150° F. and showed excellent dispersion. Water paint films brushed out satisfactorily and exhibited good appearance and opacity.

The specific amounts of the various ingredients of the metallic paste pigment formulations of the invention may be varied within wide limits. A commercially practicable range for the various ingredients which has been found economical, but not limiting, can be stated in terms of mixtures having the approximate compositions by weight, 40 to 78 per cent metallic flake cake, or paste, containing 5.0 to 20.0 per cent mineral spirits, or equivalent volatile hydrocarbon, and 0.25 to 3.0 per cent of at least one of the fatty acids from the group stearic, palmitic, oleic and ricinoleic acids; in admixture with 3.0 to 25 per cent of at least one of the water-soluble, soap-forming amino compounds, 2-amino-1-butanol, 2-amino-2-methyl-1-propanol, 2-amino-2-methyl-1,3-propanediol, the isopropanolamines, the ethanolamines, morpholine and mono-n-butyl amine, with the balance substantially tall oil with up to 10.0 per cent of its weight resinous oil or material, such as ester gum.

The tall oil, and/or ester gum content of the paste pigment formulations of the invention is preferably present between 15 and 45 per cent of the total weight of a particular metallic paste pigment formulation. Also, variations in the amounts of the several ingredients, and any particular selection of the equivalents in a specific paste formulation, will have a bearing upon whether hot or cold water should be employed in the final paint mixture. In any case, it is preferred to employ hot or warm water to hasten the mixing time in any particular instance.

Commercial tall oil has been referred to and employed in all the examples, with the exception of Example I, in which case approximately 10 per cent of the tall oil has been replaced by ester gum, as the major portion of the liquid phase of the metallic paste pigment formulations of this invention. By the term, the "balance substantially tall oil," wherever used, is meant commercial tall oil with additions of other compatible resinous oils.

What is claimed is:

1. A water-emulsifiable, casein-free, aluminum paste pigment formulation comprising a mixture of 52.3 per cent aluminum flake, 13.3 per cent mineral spirits, 1.0 per cent stearic acid, 21.0 per cent tall oil, 2.4 per cent ester gum and 10.0 per cent morpholine, said aluminum paste pigment formulation being characterized by its stability, paste-retaining consistency and freedom from agglomerate formation under storage conditions sealed against atmosphere.

2. A water-emulsifiable, casein-free, aluminum paste pigment formulation comprising a mixture of 52.3 per cent aluminum flake, 13.3 per cent mineral spirits, 1.0 per cent stearic acid, 23.4 per cent tall oil and 10.0 per cent triethanolamine, said aluminum paste pigment formulation being characterized by its stability, paste-retaining consistency and freedom from agglomerate formation under storage conditions sealed against atmosphere.

3. A water-emulsifiable, casein free, metallic paste pigment formulation comprising a mixture of 40 to 78 per cent metallic flakes, 5 to 20 per cent volatile hydrocarbon, and 0.25 to 3 per cent of at least one fatty acid selected from the group consisting of stearic, oleic, palmitic and ricinoleic acids; with 15 to 45 per cent tall oil and 3 to 25 per cent of at least one water-soluble, soap-forming amino compound selected from the group consisting of 2-amino-1-butanol, 2-amino-2-methyl-1-propanol, 2-amino-2-methyl-1,3-propanediol, the isopropanolamines, the ethanolamines, morpholine, and mono-n-butyl amine, and said metallic paste pigment formulation being characterized by its stability, paste-retaining consistency and freedom from agglomerate formation under storage conditions sealed against atmosphere.

4. A water-emulsifiable, casein-free, aluminum paste pigment formulation comprising a mixture of 40 to 78 per cent aluminum flake, 5 to 20 per cent volatile hydrocarbon, and 0.25 to 3 per cent of at least one available fatty acid selected from the group consisting of stearic, oleic, palmitic and ricinoleic acids; with 15 to 45 per cent tall oil and 3 to 25 per cent of at least one water-soluble, soap-forming amino compound selected from the group consisting of 2-amino-1-butanol, 2-amino-2-methyl-1-propanol, 2-amino-2-methyl-1,3-propanediol, the isopropanolamines, the ethanolamines, morpholine and mono-n-butyl amine, and said aluminum paste pigment formulation being characterized by its stability, paste-retaining consistency and freedom from agglomerate formation under storage conditions sealed against atmosphere.

5. A water-emulsifiable, casein-free, copper paste pigment formulation comprising a mixture of 40 to 78 per cent copper flake, 5 to 20 per cent volatile hydrocarbon, and 0.25 to 3 per cent of at least one fatty acid selected from the group consisting of stearic, oleic, palmitic and ricinoleic acids; with 15 to 45 per cent tall oil and 3 to 25 per cent of at least one water-soluble, soap-forming amino compound selected from the group consisting of 2-amino-1-butanol, 2-amino-2-methyl-1-propanol, 2-amino-2-methyl-1,3-propanediol, the isopropanolamines, the ethanolamines, morpholine, and mono-n-butyl amine, and said copper paste pigment formulation being characterized by its stability, paste-retaining consistency and freedom from agglomerate formation under storage conditions sealed against atmosphere.

6. A water-emulsifiable, casein-free, aluminum paste pigment formulation comprising a mixture of 40 to 78 per cent aluminum flake, 5 to 20 per cent mineral spirits, 0.25 to 3 per cent stearic acid, 15 to 45 per cent tall oil, and 3 to 25 per cent triethanolamine, said aluminum paste pigment formulation being characterized by its stability, paste-retaining consistency and freedom from agglomerate formation under storage conditions sealed against atmosphere.

ROBERT I. WRAY.
    WAYNE B. ROBERTS.

REFERENCES CITED

The following references are of record in the file of this patent:

UNITED STATES PATENTS

| Number | Name | Date |
|---|---|---|
| 2,002,891 | Hall | May 28, 1935 |
| 2,362,884 | Clark | Nov. 14, 1944 |
| 2,401,666 | Schmidt | June 4, 1946 |